(12) United States Patent
Dobson (10) Patent No.: US 10,801,761 B2
(45) Date of Patent: Oct. 13, 2020

(54) PASSIVE HEAT RECOVERY OR DEFROSTING DEVICE USING A CLOSED LOOP HEAT TRANSFER CIRCUIT

(71) Applicant: James W. Dobson, Warren (CA)

(72) Inventor: James W. Dobson, Warren (CA)

(*) Notice: Subject to any disclaimer, the term of this patent is extended or adjusted under 35 U.S.C. 154(b) by 109 days.

(21) Appl. No.: 15/928,942

(22) Filed: Mar. 22, 2018

(65) Prior Publication Data

US 2018/0274834 A1 Sep. 27, 2018

Related U.S. Application Data

(60) Provisional application No. 62/476,588, filed on Mar. 24, 2017.

(51) Int. Cl.
| | |
|---|---|
| *F25B 47/02* | (2006.01) |
| *F24H 9/00* | (2006.01) |
| *F24D 19/00* | (2006.01) |
| *F25B 23/00* | (2006.01) |
| *F28D 15/02* | (2006.01) |
| *F28D 21/00* | (2006.01) |

(52) U.S. Cl.
CPC .......... *F25B 47/02* (2013.01); *F24D 19/0095* (2013.01); *F24H 9/0084* (2013.01); *F25B 23/006* (2013.01); *F28D 15/0233* (2013.01); *F28D 15/0266* (2013.01); *F28D 21/0005* (2013.01); *F24D 2200/12* (2013.01); *F24D 2200/16* (2013.01); *F25B 2347/02* (2013.01)

(58) Field of Classification Search
CPC .... F25B 47/02; F25B 23/006; F25B 2347/02; F28D 15/0233; F28D 21/0005; F28D 15/0266; F24D 19/0095; F24D 2200/16; F24D 2200/12; F24H 9/0084
USPC ............................................................ 62/81
See application file for complete search history.

(56) References Cited

U.S. PATENT DOCUMENTS

| | | | |
|---|---|---|---|
| 6,564,861 B1* | 5/2003 | Miyazaki | ............ F28D 15/0266 165/104.21 |
| 2004/0194929 A1* | 10/2004 | Ippoushi | ............. F28D 15/0266 165/104.29 |
| 2017/0336073 A1 | 11/2017 | Weir et al. | |
| 2018/0306460 A1 | 10/2018 | Weir | |

* cited by examiner

*Primary Examiner* — Steve S Tanenbaum
(74) *Attorney, Agent, or Firm* — Kyle R Satterthwaite; Ryan W Dupuis; Ade & Company Inc.

(57) ABSTRACT

A passive heat recovery or defrosting apparatus features an evaporator, a condenser, and vapour and liquid conveyance lines connected therebetween. The vapour and liquid conveyance lines respectively connect to upper and lower ends of the evaporator and condenser. The evaporator and/or condenser has a ring-shaped body for fitting around or inline with a pipe to achieve heat exchange relation with a fluid passing therethrough. The evaporator is installed on or inside a warm pipe or duct (e.g. waste drain pipe, clothes dryer exhaust duct, flue pipe, or indoor section of a sewer vent stack) at a lower elevation than the condenser. The condenser is placed on an outdoor end of either a sewer stack or air intake duct for defrosting purposes, or is placed on a water supply line or air intake of a hot water tank, clothes dryer, etc. Working fluid circulates passively between the evaporator and condenser.

19 Claims, 9 Drawing Sheets

PASSIVE HEAT RECOVERY OR DEFROSTING DEVICE USING A CLOSED LOOP HEAT TRANSFER CIRCUIT

FIELD OF THE INVENTION

The present invention relates generally to devices for defrosting vent or intake pipes that traverse a building envelope, or for recovering heat from warm exhaust or drain pipes of buildings and appliances.

BACKGROUND

A known problem in cold weather climates is the buildup of frost and ice on intake and vent pipes, for example on sewer stack vent pipes and the intake air pipes of high efficiency furnaces and water heaters. Such freezing over of vent and intake pipes can lead to backup of unpleasant gases inside the building envelope and cause equipment to shut down, fail or operate poorly.

Prior solutions have involved use of electrically powered heating devices, for example wrapping electrical heat tape around a vent stack or mounting a specialized heating appliance thereon.

Also, energy efficiency and conservation are receiving more attention than ever, from which there has arisen a demand for energy recovery devices that recover heat energy from waste streams and apply or store this recovered waste heat in useful manner to reduce energy consumption.

Applicant has designed a defroster/heat-recovery apparatus that addresses the shortcomings of prior vent/intake defrosters, and also provides an alternative to existing heat recovery solutions.

SUMMARY OF THE INVENTION

According to a first aspect of the invention, there is provided a passive heat recovery or defrosting apparatus comprising:
an evaporator;
a condenser;
fluid conveyance lines connected between the evaporator and the condenser to form a closed loop therewith, said fluid conveyance lines including a vapour conveyance line for travel of vapour from the evaporator to the condenser and a liquid conveyance line for travel of liquid from the condenser to the evaporator;
a working fluid contained within said closed loop;
wherein either the evaporator of the condenser comprises a first ring-shaped body for placement around or inline with a first pipe or duct in order to undergo heat exchange with a substance flowing through of said first pipe or duct, said first ring-shaped body having a first annular internal chamber into which the liquid conveyance opens near a bottom end of said chamber, and into which the vapour conveyance line opens at a more elevated location than said liquid conveyance line; and
said vapour and liquid conveyance lines are routed, or are routable, downwardly from said condenser to a point of lower elevation at a spaced distance from said condenser to place the evaporator at said lower elevation, whereby evaporated working fluid from the evaporator rises up into the condenser through the vapour conveyance line, then condenses back into a liquid state before gravitationally returning to the evaporator through the liquid conveyance line.

In some embodiments, the condenser comprises said first ring-shaped body for placement around or inline with the first pipe or duct, and the evaporator comprises a second ring-shaped body with a second annular internal chamber, whereby the evaporator is arranged for placement around a second pipe or duct.

In one embodiment, the apparatus is used in combination with a concentric vent assembly featuring an inner flue pipe disposed concentrically inside a larger outer intake pipe, wherein the second ring-shaped body of the evaporator is placed around the inner flue pipe and the first ring-shaped body of the condenser is placed around the larger outer intake pipe.

In some embodiments, the apparatus is used in combination with an exhaust line of a heating appliance, and the evaporator comprises the first ring-shaped body, which is placed around said exhaust line to collect heat therefrom.

The heating appliance may be a clothes dryer, furnace, or hot water heater.

In such instances, the condenser may be placed in heat exchange relationship with at least the air intake of said heating appliance.

The condenser may also be placed in heat exchange relationship with a water supply line of a hot water heater in order to preheat incoming supply water for said hot water heater.

In some embodiments, the condenser comprises a multi-section condenser circuit having different condenser sections in respective heat exchange relationships with different heat-requiring applications Said multi-section condenser circuit may comprise one or more valves operable to control which of said different condenser sections receives the working fluid vapour from the evaporator.

In one embodiment, the different sections of the multi-section condenser circuit are in respective heat exchange relation with the air intake of the heating appliance and the hot water heater supply line.

In one embodiment, the evaporator comprises the first ring-shaped body, which is placed around a wastewater pipe.

In other embodiments, the condenser comprises said first ring-shaped body for placement around or inline with said first pipe or duct.

In such instances, there may be an outer mounting unit that closes concentrically around the ring-shaped condenser and has a lower end arranged to fit externally over an end of the first pipe or duct to support the ring-shaped condenser inline thereon.

Preferably the mounting unit comprises an internal shoulder atop which the ring-shaped condenser is seated to carry the ring-shaped member concentrically above the end of the pipe.

When used as a defroster with the condenser in an outdoor location at or adjacent a top outdoor end of an upright pipe, the apparatus preferably has a tapered upper end above the top outdoor end of the pipe to prevent ice accumulation thereabove.

Preferably the mounting unit is tapered at an upper end thereof to prevent ice accumulation atop same.

In one embodiment, the conveyance lines comprise pipes extending longitudinally of the condenser to hang therefrom in predetermined positions relative thereto.

In such instance, the evaporator may be an additional pipe coupled between said conveyance lines at lower ends thereof.

The evaporator may comprise a charging port for introduction of working fluid to the closed loop through said evaporator section.

In one embodiment, first and second connections of the conveyance lines to the ring-shaped condenser are both located on an interior of said ring-shaped body condenser.

In another embodiment, the first and second connections of the conveyance lines to the ring-shaped condenser are both located at an exterior of said ring-shaped condenser.

In one embodiment, the ring-shaped condenser is placed atop an outdoor discharge end of the first pipe or duct to form an inline extension thereof. In such instance, said first pipe or duct may be a sewer stack vent pipe.

In another embodiment, the ring-shaped condenser is arranged for external engagement around the discharge end of the first pipe or duct. In such instance, the first pipe or duct may be an air intake pipe.

In some embodiments, the conveyance lines comprise flexible conduits routable in various directions to various locations relative to the condenser and the evaporator.

In some embodiments, the evaporator comprises the first ring-shaped body, which is arranged for placement around an exhaust line through which a heated fluid is conveyed, thereby establishing a heat exchange relationship with said exhaust line for evaporating the working fluid within said ring-shaped body.

In such instance, the condenser may comprise a second ring-shaped body installed on an air intake leading to a heating appliance from which said exhaust line leads to the outdoor environment.

In embodiments where the condenser is placed outdoors for defrosting purposes, the heated location(s) at which one or more evaporator sections are installed is/are preferably within the exterior envelope of the building.

In one such instance, said first pipe or duct traverses through the exterior envelope of a building between an indoor space of the building and a surrounding outdoor environment, the condenser is installed on said first pipe or duct at or adjacent an exterior end thereof situated outside the building in the outdoor environment to defrost said exterior end of said first pipe or duct, and the evaporator is located within the indoor space of the building.

According to a third aspect of the invention, there is provided a method of defrosting a vent or intake pipe that traverses through an exterior envelope of a building between an indoor space of the building and a surrounding outdoor environment, said method comprising passively circulating a working fluid between a condenser situated at or adjacent an exterior end of the vent or intake pipe in the outdoor environment and an evaporator situated at a heated location of lower elevation than said condenser.

Said condenser may be a ring-shaped condenser situated in concentric relationship to said vent or intake pipe at or adjacent the exterior end thereof.

The evaporator may be a ring-shaped evaporator situated concentrically around an exhaust line of a heating appliance.

In such instances, the evaporator and the condenser are preferably interconnected by flexible tubes routed externally of said vent or intake pipe for respective vapour and liquid flow between said evaporator and condenser via said flexible tubes.

Alternatively, instead of a ring-shaped unit placed externally around an exhaust line, the evaporator may be suspended within said vent or intake pipe from the condenser.

In such instance, the evaporator may be suspended within said vent or intake pipe via rigid pipes that inter-connect the evaporator and the condenser for respective vapour and liquid flow between said evaporator and condenser via said rigid pipes.

Preferably the heated location is within the exterior envelope of the building.

BRIEF DESCRIPTION OF THE DRAWINGS

Preferred embodiments of the invention will now be described in conjunction with the accompanying drawings in which.

In the drawings like characters of reference indicate corresponding parts in the different figures.

DETAILED DESCRIPTION

Figures 1, 1A:
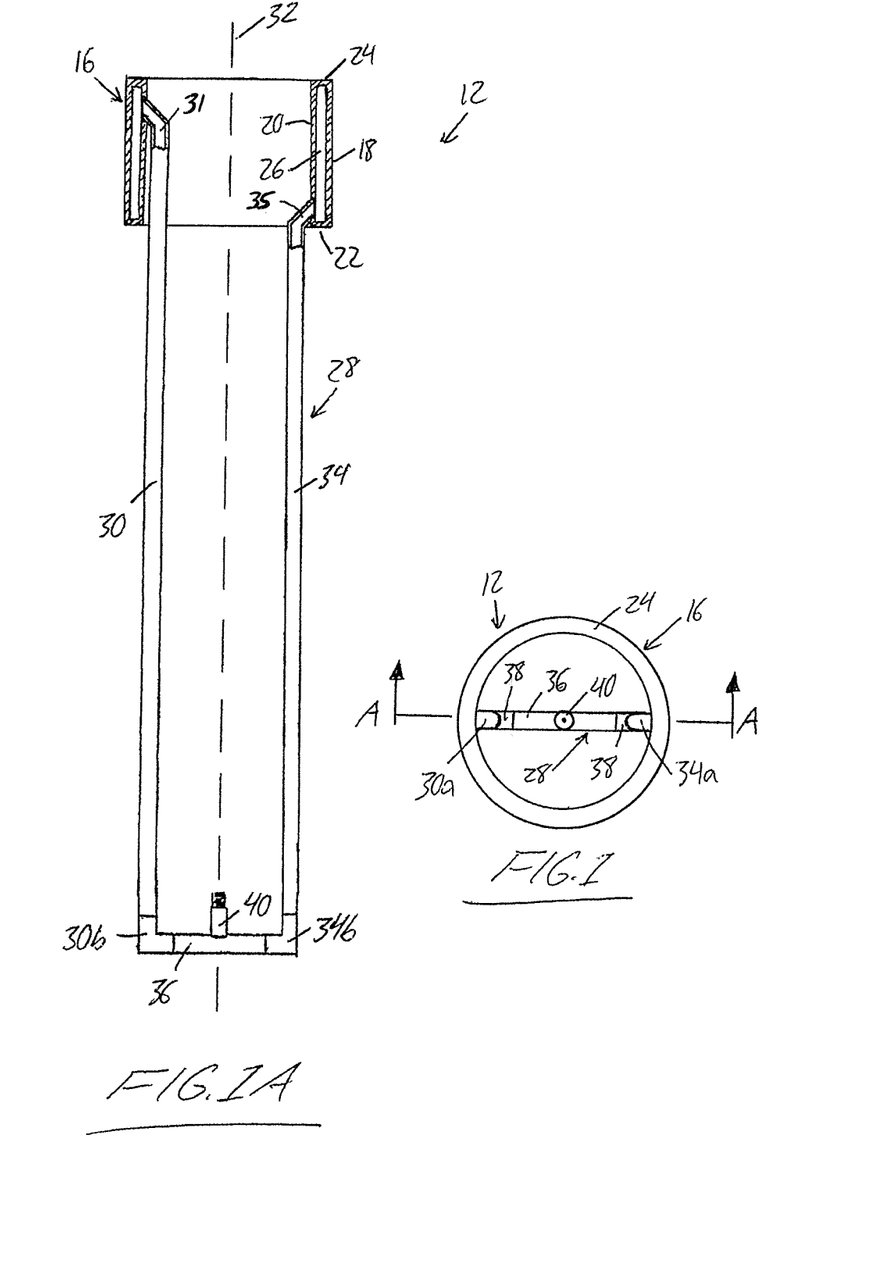
FIG. 1 is an overhead plan view of a stack vent defroster according to a first embodiment of the present invention.
FIG. 1A is a side elevational view of the stack vent defroster of FIG. 1, partially cross-sectioned along line A-A thereof.
Figure 2:
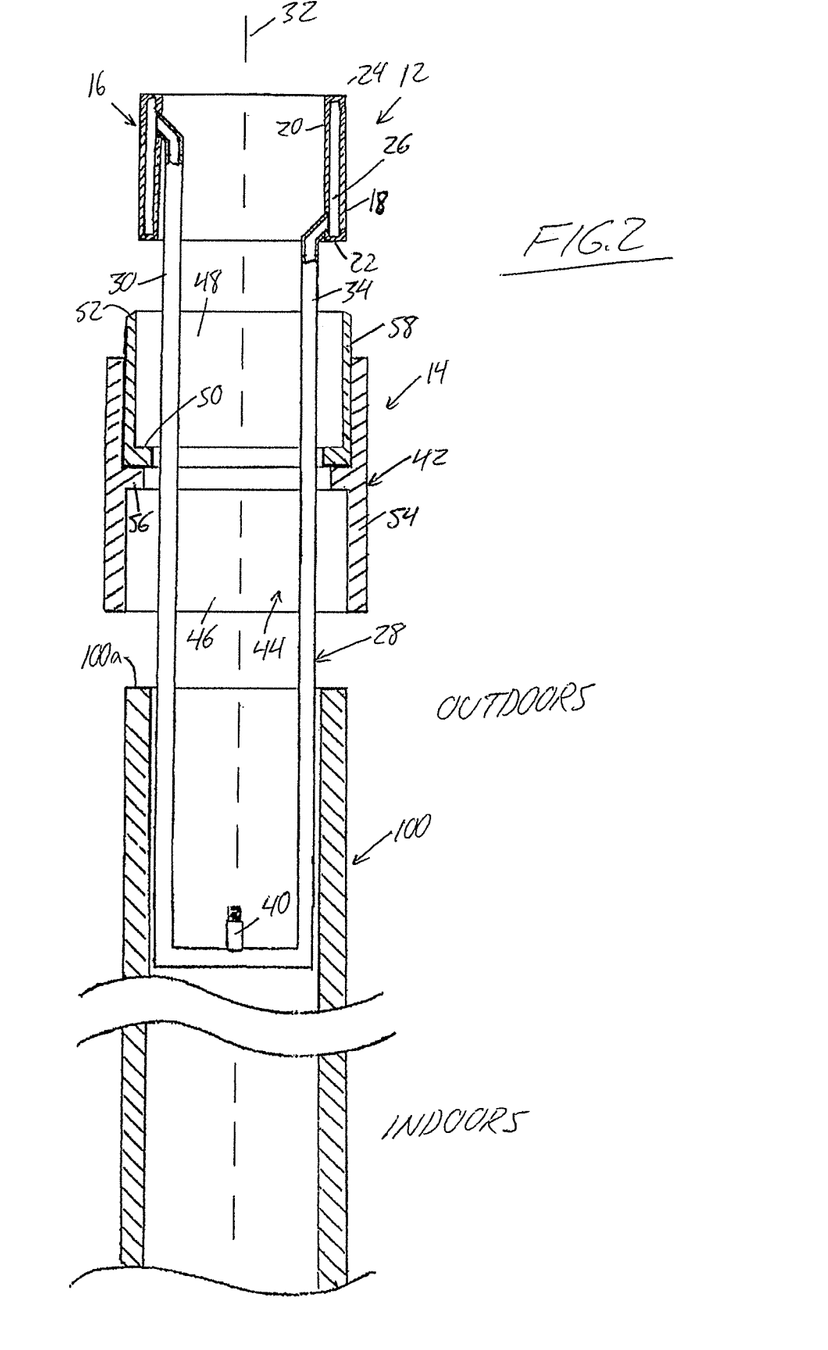
FIG. 2 is an exploded elevational view illustrating installation of the stack vent defroster of FIG. 1A on the outlet end of a stack vent pipe using a mounting collar, both of which is sectioned in the same cross-sectional plane as FIG. 1A.
Figure 3:
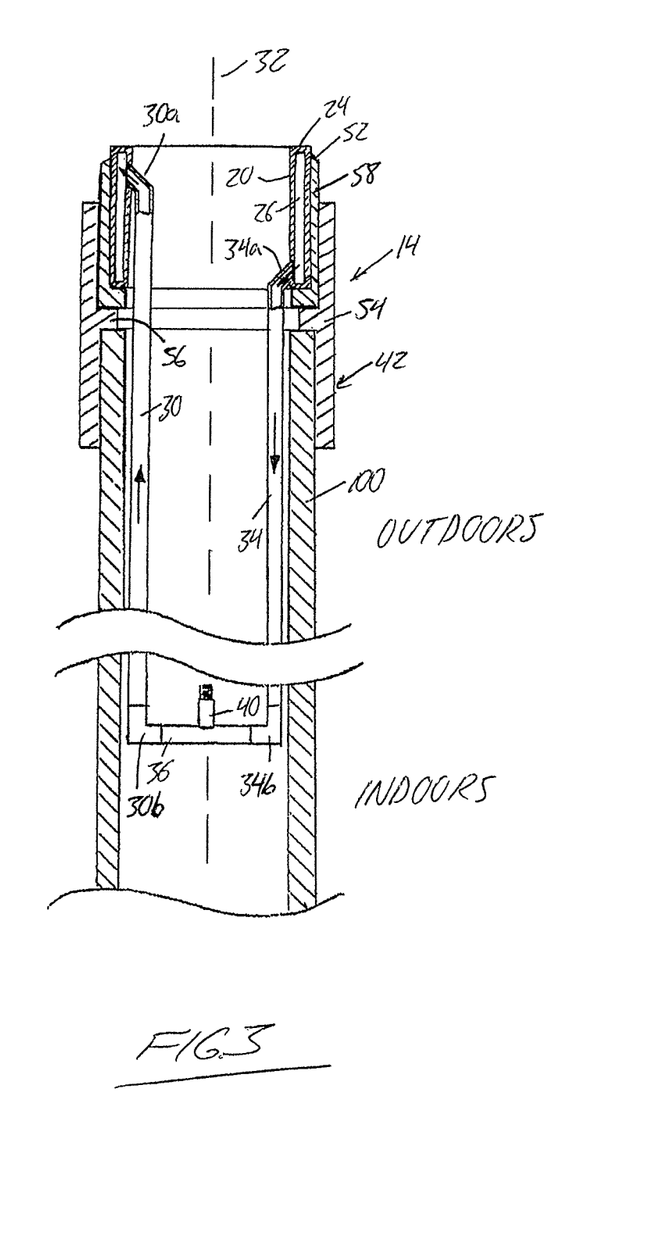
FIG. 3 is an assembled elevational view illustrating the defroster in its fully installed position on the outlet end of the stack vent pipe.

FIGS. 1 to 3 illustrate a pipe defroster 10 suited for use on a sewer stack vent pipe that penetrates the roof of a residential home or other building to exhaust gases from the building's drain-waste-vent system to the ambient outdoor environment, thereby preventing release of such gases within the indoor space of the building. FIG. 1 illustrates a primary working unit 12 of the defroster, while FIGS. 2 and 3 illustrate assembly thereof with an accompanying mounting unit 14 in order to install the defroster on the stack vent pipe 100 at the exterior end 100a thereof that resides outside the building within the outdoor environment at a spaced elevation above the roofline of the building.

The working unit 12 features a ring-shaped condenser 16 having a cylindrical outer wall 18, a cylindrical inner wall 20 having a smaller diameter than the outer wall and residing concentrically inside same, an annular bottom wall 22 joining the inner and outer walls together at the bottom ends thereof, and an annular top wall 24 joining the inner and outer walls together at the top ends thereof, and thus cooperating with the other walls to enclose an annular internal chamber 26 within the resulting ring-shaped body.

A pipe assembly 28 features a first vertical length of pipe 30 that fluidly communicates with the internal chamber 26 of the ring-shaped condenser through the inner wall near the top end thereof, for example via a 45-degree elbow fitting 31. This first pipe 30 defines a vapour conveyance line running downward from the ring-shaped condenser at a distance spaced radially outward from a central longitudinal axis 32 of the ring-shaped condenser 16 in an axial orientation parallel thereto. A second vertical length of pipe defines a liquid conveyance 34 line that lies parallel to the vapor conveyance line 30 at a position symmetrically disposed across the longitudinal axis 32 therefrom. The liquid conveyance line 34 fluidly communicates with the internal chamber 26 of the ring-shaped condenser 16 through the inner wall 20 near the bottom end thereof, for example via a 45-degree elbow fitting 35. A shorter evaporator pipe 36 horizontally joins together the two vertical pipes 30, 34 at the bottom ends thereof, thus spanning diametrically across the central longitudinal axis 32 at a notable axial distance downwardly from the bottom end of the ring-shaped condenser 16. Each conveyance line 30, 34 lies closely adjacent the inner wall 20 in diametrically opposite relation to the other conveyance line to maximize the distance therebetween, whereby each line 30, 34 resides closer to the inner wall of the ring-shaped condenser than to the central longitudinal axis 32.

The two conveyance lines 30, 34 cooperate with the evaporator pipe 36 and the interior chamber 26 of the ring-shaped condenser 16 to define a closed loop circuit. A refrigerant or other heat transfer working fluid is introduced into this closed loop via a normally-closed charging valve 40, which in the illustrated embodiment is installed on the evaporator pipe 36, but may alternatively be installed elsewhere in the loop.

In the installed position of the defroster, described in further detail below in relation to FIG. 3, the ring-shaped condenser 16 is carried at the exterior end 100a of the stack vent pipe 100 in the outdoor environment, and the conveyance lines 30, 34 reach downwardly through the stack vent pipe to carry the evaporator pipe 36 at a location below the roofline of the building, and thus within the climate controlled interior space of the building. Accordingly, installed in late autumn or early winter for use in the cold weather season, where the climate controlled interior space of the building is heated to notably greater temperatures than the outdoor environment, the working fluid in the evaporator pipe 36 is subject to heat transfer from any warmer gases rising up the vent pipe 100, and from the heated indoor air of the building that surrounds the vent pipe 100. This heating of the working fluid in the evaporator pipe 36 causes evaporation of the working fluid into its vapour state, and this vapour moves up the vapour conveyance line 30 by capillary action, similar to that of a heat pipe. The rising vapour enters the internal chamber 26 of the ring-shaped condenser 16 near the upper end thereof.

Since the ring-shaped condenser 16 is located outside the building at the exterior end 100a of the stack pipe 100, latent heat from the vapourized working fluid in the internal chamber 26 of the condenser is released to the colder outdoor environment, and the working fluid thus condenses back to its liquid state. The liquefied working fluid pools at the floor of the internal chamber 26 atop the bottom wall 22 of the ring-shaped condenser 16, and thus drains into the liquid conveyance line 34 that communicates with the chamber 26 at floor level. The liquefied working fluid is gravitationally returned to the evaporator pipe 36 through the liquid conveyance line 34, whereupon the working fluid begins the evaporation/condensation cycle anew by collecting latent heat at the evaporator pipe 36.

FIG. 2 illustrates assembly of the primary working unit 12 onto the stack vent pipe 100 via the mounting unit 14. The mounting unit defines a collar 42 for fitting externally over the exterior end 100a of the vent pipe 100, while internally receiving the ring-shaped condenser 16 of the primary working unit 12 in a position atop the vent pipe in a secure and stable, but easily removable, manner. The collar 42 features an axial through-bore 44 with a lower section 46 whose diameter is equal to or slightly greater than the outer diameter of the vent pipe 100 at the exterior end 100a thereof, which enables a snug sliding fit of the lower section of the collar 42 externally onto the vent pipe 100 over the exterior end 100a thereof. The upper section 48 of the collar's through-bore features a diameter that is equal to or slightly exceeds the outer diameter of the ring-shaped condenser's outer wall 18. An inwardly jutting annular ledge 50 at an intermediate area of the through-bore between the upper and lower sections thereof defines an upward facing seat or shoulder atop which the bottom wall 22 of the ring-shaped condenser 16 can be seated under axial sliding of the ring-shaped condenser 16 into the collar 42 from the top end thereof.

FIG. 3 shows the fully installed vent defroster, where the lower section of the mounting collar 42 is externally fitted over the exterior end 100a of the vent pipe 100 in concentric relation thereto, and the ring-shaped condenser 16 is internally received in the collar 42 in a seated position atop the inner ledge 50 thereof. The inner diameter of the ring-shaped condenser 16 is of equal or near-equal measure to the inner diameter of the stack vent pipe 100, whereby the inner wall of the ring-shaped condenser resides generally flush with the inner wall surface of the vent pipe 100. Accordingly, the ring-shaped condenser forms a concentrically aligned, same-diameter extension of the vent pipe, and thus does not create a constriction at the exterior end thereof. The working fluid conveyance lines 30, 34 reach downwardly through the exterior end 100a of the vent pipe past the roof line of the building and into the building's interior attic space.

The top annular wall 24 of the ring-shaped condenser lies generally near the annular top end of the mounting unit collar 42, and in slightly elevated relation thereto in the non-limiting example of the illustrated embodiment. As shown, the top end of the mounting unit collar 42 may be upwardly tapered by a frusto-conical chamfer 52. This way, snow or ice melted by the release of latent heat at the condenser 16 and falling down onto the surrounding mounting unit collar 42 will reliably flow downward off the chamfered top end 52 of the mounting unit collar 42 to prevent buildup of ice atop same.

The illustrated embodiment is based on a tested prototype of the invention, in which a two-piece collar construction was used, where a conventional female-to-female PVC pipe coupler 54 forms an outer piece of the collar. The lower half of the coupler, below a centrally located inner flange 56 thereof, defines the lower portion 46 of the overall collar's through-bore. A mating piece of PVC pipe 58 bored out to an enlarged diameter over most of its axial length from the upper end thereof is axially received in the top end of the pipe coupler 54, and is seated against the inner flange 56 of the coupler 54. This mating piece of PVC pipe 58, as an inner piece of the two-piece collar, gives the upper portion 48 of the collar bore a smaller diameter than the lower section 46. The inner piece 58 of the collar was initially of equal inner and outer diameter to the stack vent pipe 100, before being bored out to a greater internal diameter over the upper majority of its axial length. The intact lower end of the inner collar piece 52 seated atop the inner flange of the outer coupler thus has an equal inner diameter to the stack vent pipe, and defines the seat ledge 50 atop which the ring-shaped condenser 16 is installed.

The ring-shaped condenser of the prototype was formed by two concentrically positioned pieces of copper pipe welded shut at their top and bottom ends, whereby these weldments formed the top and bottom walls of the ring-shaped condenser to enclose the internal chamber annularly between the two pieces of copper pipe. The selected diameter of the outer copper pipe was lesser than the outer diameter of the stack vent pipe, hence the use of the inner collar piece 58 as a diameter-reducing insert in the upper half of the outer female/female pipe coupler 54 that has the same diameter at both ends. In other embodiments, a female/female coupler alone may be used as the mounting collar if the outer diameter of the ring-shaped condenser equals the outer diameter of the vent pipe 100, in which case the ledge-defined seat or shoulder 50 for supporting the ring-shaped condenser 16 would be defined directly by the inner flange 56 of the pipe coupler 54.

The vent pipe defroster has no electrical heating elements and uses capillary and gravitational circulation of its working fluid, and thus requires no electrical power. The illustrated embodiment, by employing a simple collar-shaped mounting unit, mounts easily in a tool-free manner by axially sliding over the exposed exterior end 100a of the vent pipe 100 without constricting the vent pipe diameter. Installation of the defroster is thus greatly simplified over electric-based defrosters of the prior art. It will be appreciated the mounting details of the defroster may be varied while still using the novel placement of a ring-shaped condenser at the exterior end of the vent pipe.

Figure 4:
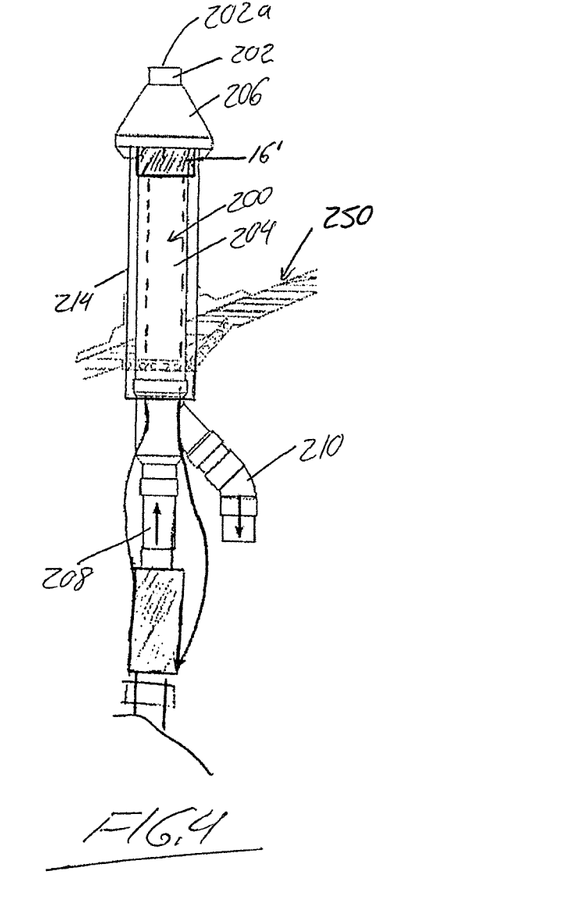
FIG. 4 is an assembled elevational view of an air intake defroster of a second embodiment of the present invention, as installed on a concentric intake/vent assembly of a high efficiency heating appliance (e.g. furnace or hot water heater).
Figures 5, 5A, 5B:
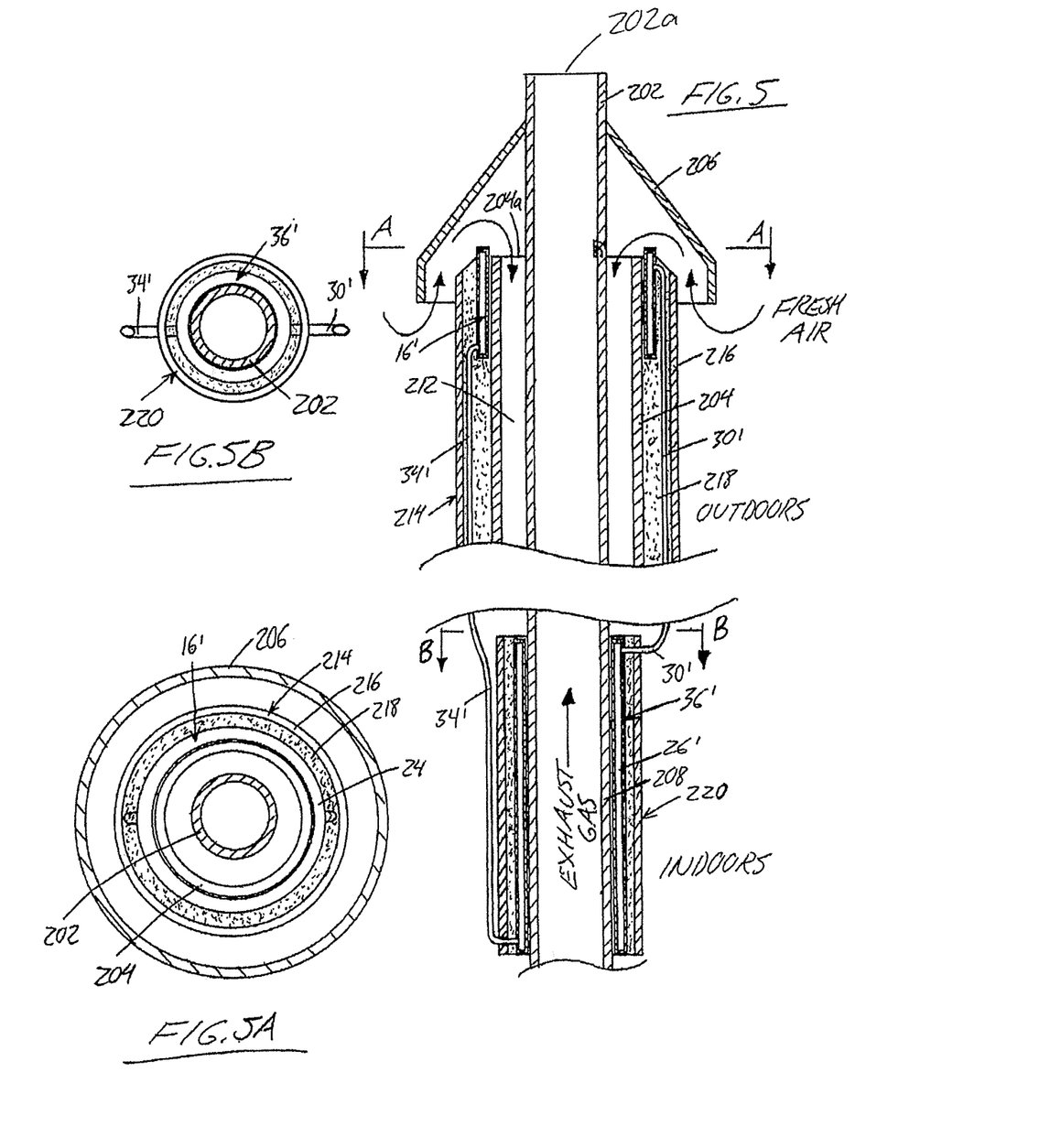
FIG. 5 is a vertical cross-section of the concentric vent assembly and air intake defroster of FIG. 4 in a shared mid-plane thereof.
FIG. 5A is a horizontal cross-section of the concentric vent assembly and air intake defroster of FIG. 5 as viewed along line A-A thereof.
FIG. 5B is a horizontal cross-section of the concentric vent assembly and air intake defroster of FIG. 5 as viewed along line B-B thereof.

FIGS. 4 and 5 illustrate a second embodiment defroster that operates similar to the first embodiment, but is configured for installation on a combustion air intake pipe of gas-fired equipment, such as a high efficiency furnace or hot water heater, that vents combustion exhaust to the outdoor environment through a flue pipe and draws fresh combustion air in through an intake pipe. The example illustrated in FIGS. 4 and 5 features a concentric vent assembly 200 passing upwardly through the roofline 250 of a building, where in a known manner, this vent assembly features an inner flue pipe 202 disposed concentrically inside a larger outer intake pipe 204. At a distance above the roofline 250, the outer intake pipe 204 terminates at an open upper end 204a beneath the widened lower end of an upwardly tapered protective shroud 206, which protects this open end of the intake pipe from weather exposure, animal access, etc. The flue pipe 202 continues upwardly beyond the end 204a of the intake pipe 204 through the shroud 206, to a discharge end 202a spaced from the shrouded upper end 204a of the intake pipe 204 and shielded therefrom by the shroud 206 so that exhaust gas doesn't feed back into the fresh air inlet defined by the intake pipe's open upper end 204a. Inside the building, exhaust ducting 208 from the gas-fired equipment connects in-line with the flue pipe 202 at a location below a terminal lower end of the intake pipe, whereby the flue pipe 202 and exhaust ducting 208 collectively form an exhaust vent line of the gas-fired equipment. Intake ducting 210 leading into the gas-fired equipment connects to the terminal lower end of the intake pipe 204 and branches outwardly to a radially offset position from the vent assembly 200. Exhaust gas from the indoor gas-fired equipment is vented to the outdoor environment through the inner flue pipe 202, and fresh combustion air is drawn into the combustion chamber of the gas-fired equipment via the annular space 212 delimited between the flue pipe 202 and the surrounding intake pipe 204.

The defroster of the present embodiment features a ring-shaped condenser 16' of similar construction to that of the first embodiment supported externally and concentrically around the intake pipe 204 at or near the open upper end thereof 204a, i.e. at the fresh air inlet of the vent assembly 200. An insulated cover 214 having an outer jacket 216 and inner insulation layer 218 is fitted externally over the intake pipe 204 and the ring-shaped condenser 16'. Instead of the rigid pipe assembly of the first embodiment, the vapour and liquid conveyance lines in the second embodiment are defined by lengths of flexible tubing 30', 34' that run internally of the insulated cover 214, down past the roofline 250 into the interior space of the building, where these flexible tubes 30', 34' emerge from the lower end of the insulated cover 214. The flexible vapour and liquid conveyance lines 30', 34' continue downward to the exhaust ducting 208, where a ring-shaped evaporator 36' is externally and concentrically disposed around the exhaust ducting 208 in heat-transfer relation therewith. The ring-shaped evaporator 36' may be of the same general construction as that the ring-shaped condenser, though as shown, may be of notably greater axial length in order to allow collection of heat from the warm exhaust gas of the gas-fired equipment over a greater surface of the exhaust ducting 208, thus achieving greater heat transfer therefrom.

Each fluid conveyance line 30', 34' communicates with the respective internal chamber of both the ring-shaped condenser 16' and the ring-shaped evaporator 36'. The flexible vapour conveyance line 30' communicates with the internal chambers near the upper ends of the condenser and evaporator, while the flexible liquid conveyance line 34' communicates with the internal chambers near the lower ends of the condenser and evaporator. As shown, an insulating sleeve 220 having similar jacket and insulation layers as the insulating cover of the ring-shaped condenser may be disposed externally over the ring-shaped evaporator to improve heat transfer efficiency between the hot exhaust gas and the evaporator. In the illustrated embodiment, the flexible conveyance lines 30', 34' penetrate radially through the insulating sleeve 220 where they connect to the evaporator 36', and are routed toward the vent assembly 200 externally of this insulated sleeve 220. Alternatively, the lines 30', 34' may be routed internally of the insulating sleeve 220, similar to the internal routing of the lines 30', 34' through the insulated cover 214 of the condenser 16'.

Like in the first embodiment, a refrigerant or other suitable heat transfer fluid is contained within the closed circuit cooperatively formed by the condenser 16', evaporator 36', and fluid conveyance lines 30', 34'. Once again, the defroster thus features a closed circuit in which a working fluid is received to provide heating at the outdoor end of a pipe that traverses a building envelope (in this case, a combustion air intake pipe 204 penetrating a roofline) via condensation of the working fluid vapour at the outdoor end 204*a* of the envelope-traversing pipe, while heat is collected by the working fluid at the indoor location of the evaporator. In the second embodiment, the ring-shaped evaporator 36' takes advantage of available exhaust heat from the same piece of equipment whose fresh-air intake is being defrosted in order to achieve improved performance. Accordingly, the heated location at which the evaporator resides is not only heated as part of the building's interior space inside the exterior building envelope, as is also the case in the first embodiment, but is also heated by an additional heat source in the form of the exhaust gas vent line.

The second embodiment is also different in that since the pipe 204 on which the defrosting action of the condenser is performed is drawing in cold outdoor air, and not emitting warm sewer gas like in the preceding stack vent embodiment, the conveyance lines 30', 34' and the evaporator 36' are not suspended within this same pipe. Instead the working fluid conveyance lines 30', 34' are routed externally of the pipe being defrosted. The evaporator in the second embodiment need not necessarily be a ring-shaped evaporator installed around an exhaust or other warm-air conveyance duct, and could alternatively just be a pipe or tubing based connection of the two conveyance lines, similar to the evaporator pipe 36 of the first embodiment. However, using the ring-shaped evaporator to achieve heat-exchange placement with an available heat source improves the performance of the overall defroster apparatus.

Figure 6:
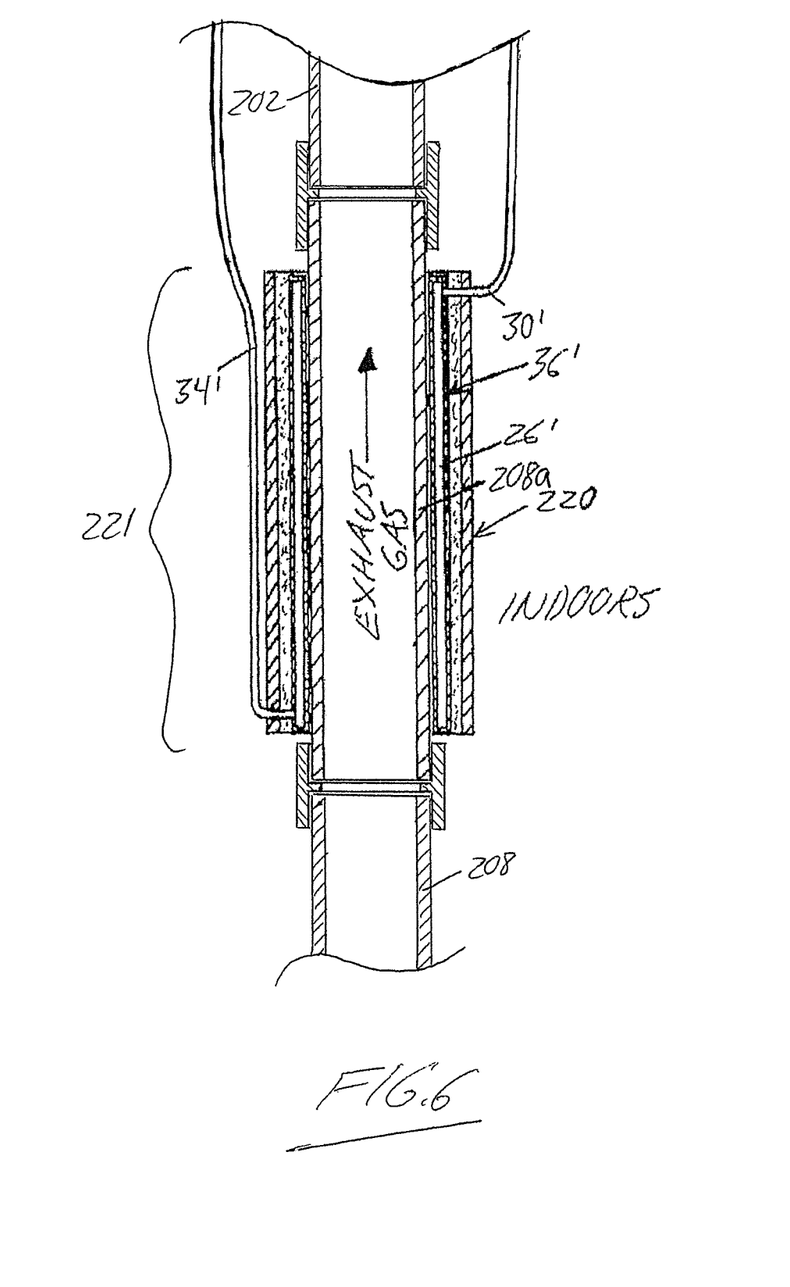
FIG. 6 is a partial vertical cross-section of a variant of the air intake defroster of FIG. 5, where an evaporator of the defroster is installed in-line with the exhaust duct of the high efficiency heating appliance as a retro-fit section of same.

In FIG. 5, the ring-shaped evaporator is fitted around the exhaust ducting either during initial assembly thereof, for example in the case of a new home build or installation of new gas-fired heating equipment or appliances, or by temporarily removing a removable duct section and placing the ring-shaped evaporator and insulation sleeve thereover before reinstalling the removed duct section. FIG. 6 illustrates another installation option, where a section of the original exhaust ducting is cut out at a selected installation location. This cut-out duct piece 208*a*, or a new replacement piece of duct substituted for the cut-out piece, has the ring-shaped condenser and insulating sleeve fitted over it, before being installed back into the exhaust line using a pair of couplers 222 installed at opposing ends of this cut-out or replacement piece of duct. Accordingly, a retro-fit kit version of the present invention may include the ring-shaped condenser and evaporator, flexible lines connected or connectable therebetween, and a pair of ductwork couplers. The insulation sleeve 220, whether factory or installer assembled, wraps around the outer wall of the ring-shaped evaporator 36" between the two couplers 222. The insulation sleeve may be long enough to reach beyond the ends of the evaporator to overlap with the couplers 222 in the final assembled state of the retro-fit unit. By using an existing or replacement piece of standardized ductwork in such a retrofit installation, direct exposure of the ring-shaped condenser to exhaust gases is avoided, as opposed to another option of using the ring-shaped condenser itself to form the replaced section of ductwork. Accordingly, this may avoid the need for regulatory testing of the ring-condenser as a safety-approved duct wall component for gas fired equipment.

While the second embodiment defrosters are illustrated in the context of a vertically-run concentric vent assembly passing upwardly through a roofline, they may similarly be employed on a horizontally-run concentric vent assembly passing outwardly through an exterior building wall, provided that the evaporator is placed at a lower elevation than the condenser to enable the gravitational/capillary circulation of the working fluid in its liquid and vapour states. In addition, it will be appreciated that the second embodiment is not limited specifically to use on concentric vent assemblies, and may be similarly installed on non-concentric intake and exhaust lines, where the flue/exhaust pipe and the fresh air intake pipe separately penetrate the building envelope.

Figure 7:
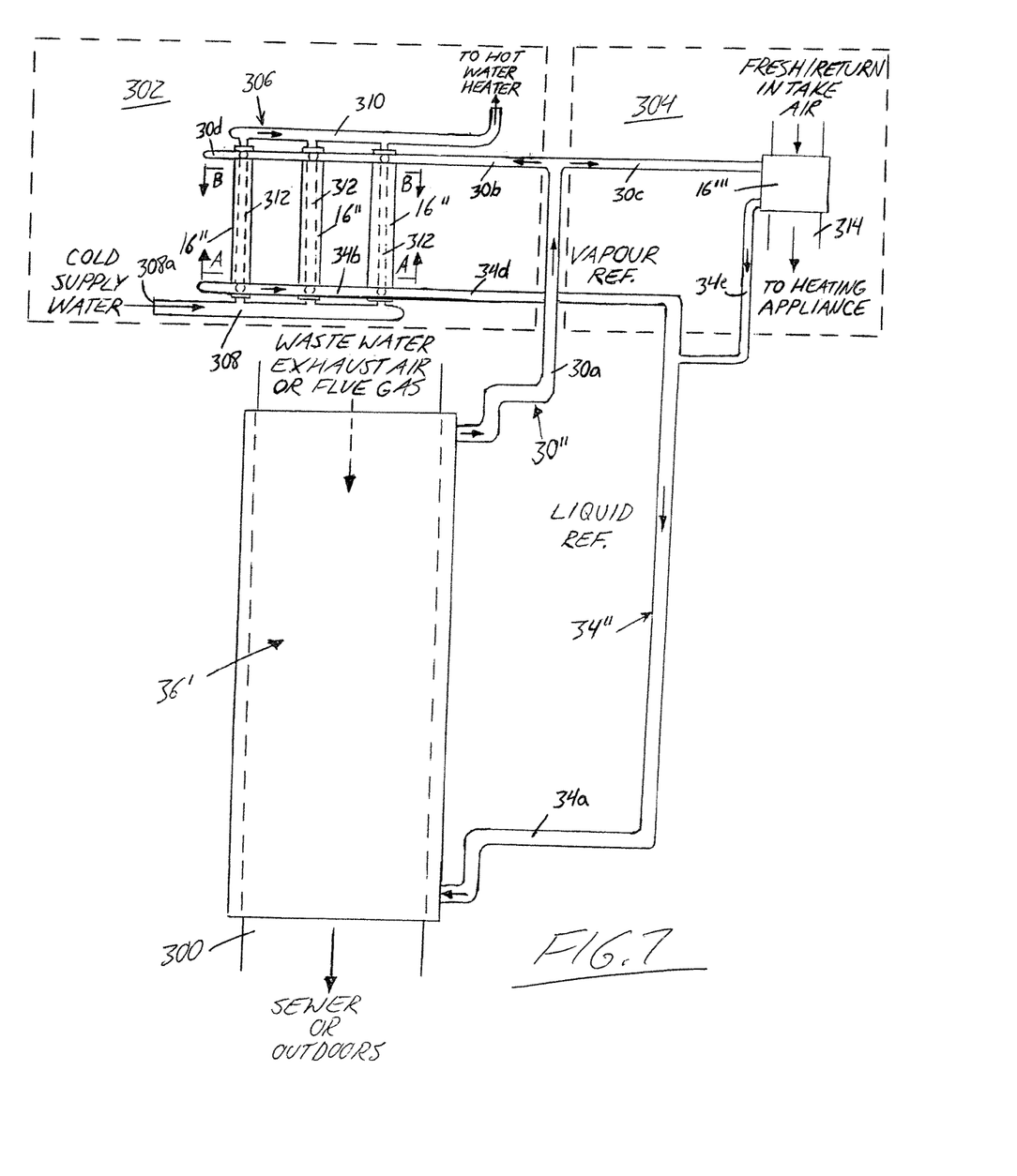
FIG. 7 is a schematic illustration of a passive heat recovery apparatus according to a third embodiment of the present invention for recouping heat energy from a wastewater pipe or appliance exhaust line, and demonstrating optional use of a multi-section condenser circuit for serving multiple heat-requiring applications.

FIG. 7 illustrates a passive heat recovery apparatus featuring a ring-shaped evaporator 36' of the same construction employed in the second embodiment. The evaporator 36' may be sized to fit externally around a building's waste drain pipe, a clothes dryer's exhaust duct, or an exhaust flue pipe of a gas-fired furnace or hot water heater, as generically represented by heat-generating pipe/duct 300 in FIG. 7. Heat energy from the wastewater, exhaust air or flue gases flowing through this this pipe or duct is thus recouped by the evaporator for use for one or more heat-requiring applications. While the illustration shows downward flow through the heat-generating pipe/duct 300, as for example would typically be the case for a waste drain pipe, it will be appreciated that the flow may instead be upwardly through the evaporator, particularly in the case of a flue pipe. The apparatus employs a multi-section condenser circuit capable of delivering reclaimed heat to multiple applications, which in the illustrated example include pre-heating of a water heater's incoming water supply to reduce the water heater's energy consumption, and pre-heating the intake air of a return or fresh air intake of heating appliance, which may for example be the same furnace, hot water heater or clothes dryer from which the evaporator is recovering waste heat from the flue pipe or exhaust duct.

The first section of the condenser circuit that acts to pre-heat the supply water referred to herein as the supply water condenser section 302, while the second section of the multi-section condenser circuit that acts to pre-heat the intake air of the heating appliance is referred to herein as the intake air condenser section 304. The supply water condenser circuit 302 in the illustrated example of the present embodiment features a plurality of ring-shaped condenser units 16" that are each of smaller diameter but greater axial length that the singular ring-shaped condenser 16 used in the first and second embodiments. The smaller diameter of these ring-shaped condenser units 16" is selected to fit on any of the standardized pipe sizes (e.g. ½-inch or ¾-inch copper piping) that are conventionally used to construct a building's water distribution system, through which pressurized water is conveyed to plumbing fixtures and appliances. Accordingly, heat recouped from the heat-generating pipe/duct 300 can be transferred to this incoming stream of supply water at a location situated upstream of a hot water heater in order to pre-heat the incoming supply water and thereby reduce energy consumption by the hot water heater.

In the illustrated embodiment, a manifold assembly 306 is installed in the supply line of the hot water heater in order to split the incoming water supply into multiple streams, each of which is acted on by a separate one of the ring-shaped condenser units 16". In other embodiments, the branched manifold assembly and associated set of condenser units 16" may be substituted by a single ring-shaped condenser unit 16" installed on an unbranched single-pipe supply line of the water heater. The manifold 306 features a header pipe 308 residing in a first horizontal plane, a collection pipe 310 residing in a second horizontal plane of elevated relation above the header pipe 308, and a plurality of upright branch pipes 312 spanning vertically upward from the header pipe 308 to the collection pipe 310. Accordingly, a single stream of supply water entering the header pipe 308 via an inlet 308a thereof is split into a plurality of branch streams each flowing through a respective one of the branch pipes 312 up into the collection pipe 310. Here, the branch streams recombine into a single unified supply stream that is fed onward to the hot water tank through an outlet 310a of the manifold's collection pipe 310.

Each one of the ring-shaped condenser units 16" closes concentrically and externally around a respective one of the manifold's branch pipes 312 so that heat energy from the evaporated working fluid inside the annular internal chamber of the condenser unit 16" can be transferred through the inner wall of the ring-shaped condenser unit, and onward through the circumferential wall of the branch pipe 312 in order to heat the respective branch stream of supply water. In this embodiment, the vapour conveyance line 30" features a main vapour line 30a that connects to the evaporator 36' near the upper end thereof, and then runs upward to a point of greater elevation, where it then splits into a water-side vapour branch 30b that feeds the supply water condenser section 302, and an air-side vapour branch 30c feeding the intake air condenser section 304. The water-side vapour branch 30b feeds a vapour header 30d of the vapour conveyance line 30" that resides just below the collector pipe 310 of the supply water manifold 306. The vapour header 30d features multiple outlets 30e that each feed into the annular chamber of a respective one of the ring-shaped condenser units 16" at the top end thereof.

Similarly, the liquid conveyance line 34" features a main liquid line 34a which connects to ring-shaped evaporator 36' near the lower end thereof so as to open into the bottom of the evaporator's internal annular chamber. A liquid collector pipe 34b of the liquid conveyance line 34" is situated just above the header 308 of the supply water manifold 306 in the supply water condenser section 302 near the bottom ends of the branch pipes 312. The liquid collector pipe 34b features multiple inlets 34c each fed by a respective one of the condenser units 16" at the bottom of the annular interior chamber thereof. Via a water-side drain branch 34d of the liquid conveyance line 34", the liquid collector pipe 34b drains into the main liquid line 34a, through which the liquid refrigerant from the condenser units 16" of the supply water condenser section 302 runs down to the bottom end of the evaporator 36' to drain into the bottom of the annular internal chamber thereof.

Figure 7A:
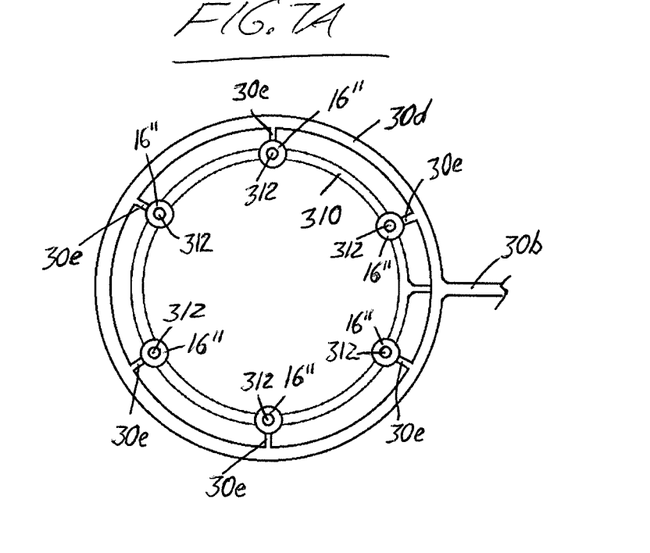
FIG. 7A is a partial cross-sectional view of the passive heat recovery apparatus of FIG. 7 as viewed along line A-A thereof.
Figure 7B:
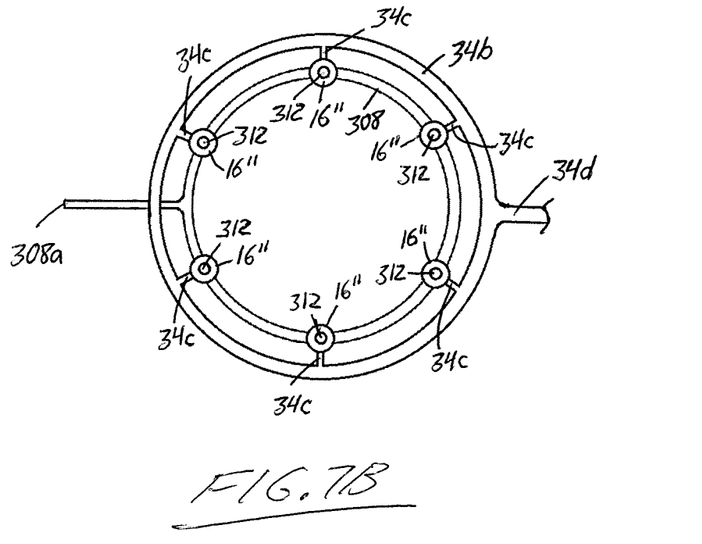

As illustrated in the cross-sectional views of FIGS. 7A and 7B, the supply water manifold 306 and the water-side condenser section 302 may use ring-shaped pipes for the header and collector pipes 308, 310 of the supply water manifold and for the vapour header 30d and the liquid collector pipe 34b of the vapour and liquid conveyance lines. In such instances, the plurality of branch pipes 312 reside in a circular array at spaced positions around the header and collector pipes 308, 310 of the supply water manifold. In other embodiments, the headers and collectors may employ straight pipes, with the branch pipes and their respective condenser units thus disposed in one or more linear arrays. The water supply manifold 306 and the condenser units 16" installed around the branch pipes 312 thereof may be a pre-fabricated unit that can simply be spliced into a hot water heater supply line at the installation site, whether as a retro-fit installation in an existing building or as part of a new-building construction, thereby reducing the amount of on-site labour required for installation. While the illustrated example features six branch pipes 312 with six respective ring-shaped condenser units 16", the quantity of branches in the supply water manifold and the corresponding number of condenser units 16" may be increased or decreased from the illustrated example.

The supply water-manifold 306 and multiple ring-condenser 16" in the supply water condenser section 302 essentially form an interconnected set of concentric-tube counter-flow heat exchangers, where at the supply water flows upwardly through inner tubes (i.e. branch pipes 312) and the condensing refrigerant flows downwardly in the annular space of the ring-shaped condenser units 16" outside the inner branch pipes 312. For simplified construction and more direct fluid-to-fluid heat transfer, each branch pipe and surrounding condenser unit may be replaced with a double-pipe heat exchanger, so that the inner wall of the condenser unit 16" and the circumferential wall of the branch pipe 312 are one in the same, thus avoiding a double-wall barrier between the supply water and the refrigerant. On the other hand, a double-walled structure may be preferred to avoid contamination of the supply water by the refrigerant. Other styles of heat exchangers other than concentric-tube counter-flow designs may alternatively be employed as the condenser 16a on the water supply line, provided that the refrigerant inlet and outlet and the flow path therebetween support the passive gravitational drainage of the condensed liquid refrigerant.

The intake air section 304 of the condenser circuit features an additional condenser 16''' installed in operable relation with a fresh or return air intake duct 314 of the heating appliance. This additional condenser is also referred to herein as an air-side condenser to distinguish it from the ring-shaped "water-side" condenser units 16" employed in the supply water condenser section of the condenser circuit. This air-side condenser 16" may be a ring-shaped condenser of the same type used in the first and second embodiments to fit externally around the air duct 314, or may be a coil or serpentine condenser placed internally within the air duct 314. The air-side vapour branch 30c of the vapor conveyance line 30" connects to the air-side condenser 16''' at the top end thereof, and an air-side drain branch 34e of the liquid conveyance line 34" connects to the bottom end of the air-side condenser 16''' to collect condensed refrigerant therefrom. The air-side drain branch 34e connects to the main liquid line 34a to direct the condensed refrigerant to the bottom of the evaporator 36'.

The heat recovery apparatus of FIG. 7 works similarly to the defrosters of the earlier embodiments. The source of the refrigerant's evaporation energy is from a stream of waste water, exhaust air or flue gas flowing through the heat-generating pipe/duct 300, and the released latent energy from the condensation of the refrigerant in the condenser circuit, instead of being used to defrost an exterior outdoor end of a sewer stack vent pipe or air intake like in the first two embodiments, is used to pre-heat a stream of supply water for a hot water heater and pre-heat a stream of fresh or return intake air for a heating appliance. The refrigerant in the annular internal chamber of the ring-shaped evaporator 36' is evaporated by the heat of the heat-generating pipe/duct 300, and rises up through the main vapour line 30a into the two condenser sections 302, 204 of the circuit.

In the supply water section 302, the evaporated refrigerant is fed into the annular internal chambers of the condenser units 16" that surround the branch pipes 312 of the supply water manifold 306. The cold supply water flowing through the branch pipes 312 absorbs heat from the vaporized refrigerant, which thus condenses back into a liquid. This liquid drains from the condenser units 16" into the main liquid line 34a via the liquid collector 34b and the water-side drain branch 34*d*, and flows gravitationally onward into the bottom of the evaporator 36', where the cycle repeats. In the intake air section 304, the evaporated refrigerant is fed into the top end of the air-side condenser 16''', and the relatively cool intake air admitted through the intake duct 314 of the heating appliance absorbs heat from the refrigerant, which thus condenses back into a liquid. This liquid refrigerant drains from the air-side condenser 16''' into the main liquid line 34*a* via the air-side drain branch 34, and flows gravitationally onward into the bottom of the evaporator 36', where the cycle repeats. As an alternative to installation of the air-side condenser 16''' on or inside an intake duct, the air-side condenser may be a serpentine air-side condenser placed over an intake opening or intake grille of an appliance, so long as the condenser resides at greater elevation than the evaporator and has its inlet, outlet and flow path appropriately positioned and oriented to enable the passive circulation of the refrigerant through the conveyance lines.

Figure 8:
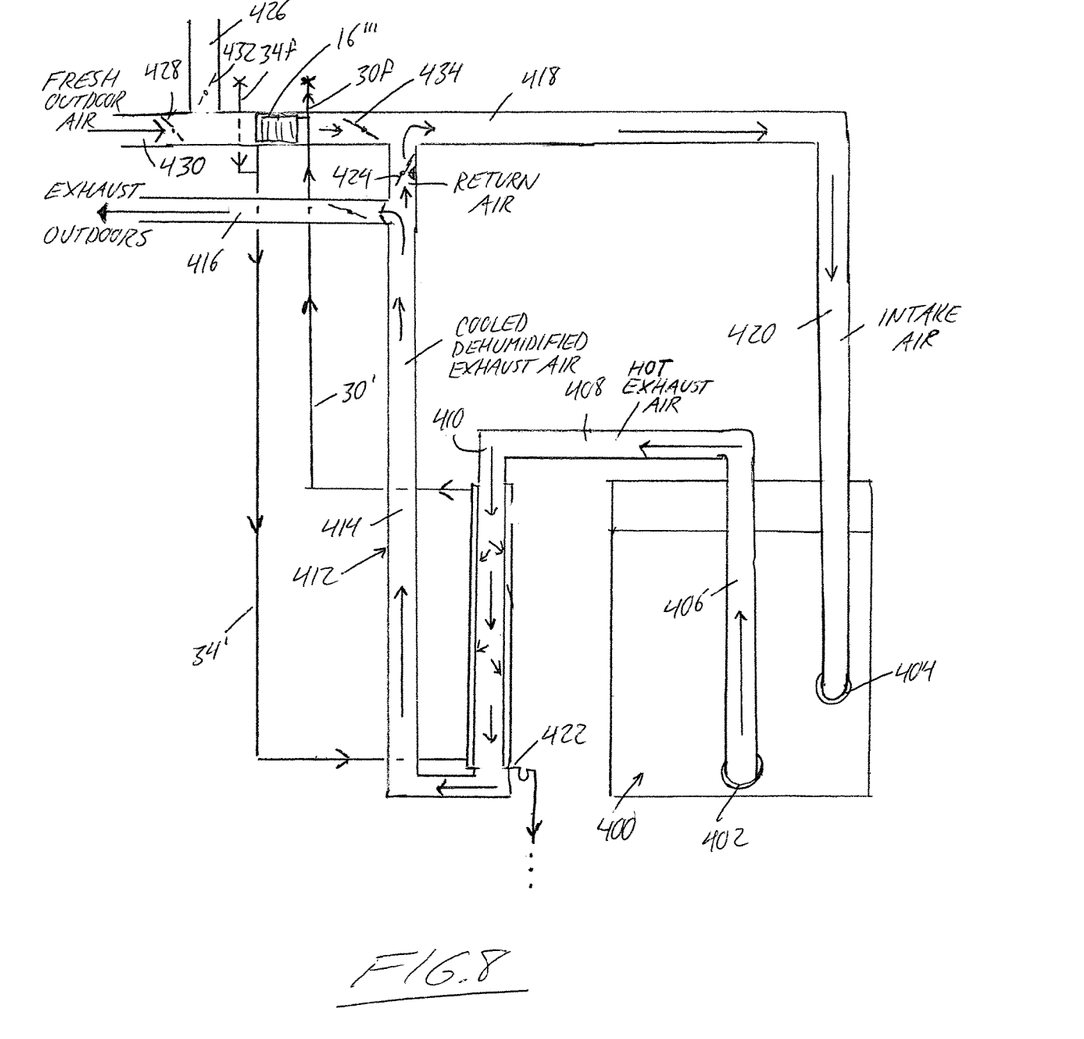
FIG. 8 schematically illustrates a fourth embodiment implementation of a passive heat recovery apparatus similar to the third embodiment, but employing only a single condenser section and specifically implemented in relation to a clothes dryer.

While FIG. 7 illustrates an example in which a multi-section condenser circuit enables reclaimed heat to be used on multiple heat-requiring applications (i.e. air and water pre-heating applications), it will be appreciated that either of the two condenser sections may alternatively be omitted. FIG. 8 illustrates one such example, where the supply water condenser section of the third embodiment has been optionally omitted, and the intake air condenser section is configured to preheat intake air of a clothes dryer whose exhaust duct is fitted with the evaporator of the heat recovery apparatus.

In a conventional manner, the clothes dryer 400 features an exhaust outlet 402, typically located in the rear wall of the clothes dryer near the bottom end thereof. Through this exhaust outlet 402 the hot moisture-rich exhaust air from the clothes dryer is conventionally exhausted to the outdoors through flexible, rigid or semi-rigid exhaust ductwork that is routed through an exterior wall of the building from the dryer's indoor location. Located elsewhere on the dryer at a distinct location from the exhaust outlet, the dryer features an air intake 404 through which a supply of intake air is drawn by a fan that pulls this incoming stream of intake air over the dryers heating coil on its path of travel into the rotating dryer drum in which wet clothes are tumbled.

The illustrated embodiment employs a heat recovery apparatus similar to that of FIG. 7, but omitting the supply water condenser section of the condenser circuit. The ring-shaped evaporator 36' is installed externally over a vertically upright duct section of the overall exhaust ductwork that leads to the outdoor environment from the exhaust outlet of the dryer. In the illustrated example, this ductwork includes an initial upward run 406 connected to the exhaust outlet 402, a lateral offset run 408 connected to the upper end of the initial run 406 to reach laterally therefrom, and a downturned run 410 running vertically downward from the other end of the lateral run in parallel relation to the initial upright run at a spaced horizontal distance therefrom. It is around rigid metal duct walls of this downturned run 410 that the ring-shaped evaporator 36' is installed. From the bottom end of this downturned run, a final exhaust run 412 leads to the outdoor environment along a suitable path, which in the illustrated embodiment features an upright segment 414 that is connected to the lower end of the downturned run 410 and leads upwardly therefrom to a final lateral segment 416 that reaches outwardly through the exterior wall of the building to the outdoor environment.

As with the other embodiments, the condenser 16''' is installed in a position of greater elevation than the evaporator, as required for the passive circulation of the refrigerant through the vapor conveyance line 30', which is once again connected to top ends of the evaporator and condenser, and the liquid conveyance line 34', which is once again connected to the bottom ends of the evaporator and condenser. In the illustrated example, the air intake 404 on the dryer is fed by intake ductwork having an initial lateral intake duct 418 that penetrates the building envelope, whether at a same or different exterior wall as the exhaust ductwork, to draw fresh intake air from the outdoor environment, and a down-turned feed duct 420 that feeds into the air intake 404 of the dryer from the indoor end of the lateral intake duct 418. The condenser 16''' is installed in operable relation with the lateral intake duct 418, for example in the form of a serpentine or coil condenser located inside the lateral intake duct 418.

In the illustrated example, the lateral segment 416 of the final exhaust run 412 branches off from the upright segment 414 thereof, which continues upwardly past the lateral segment 416 of the exhaust run to tie into the lateral intake duct 418 at a location downstream of the condenser 16'''. This enables recirculation of exhaust air from the dryer back to the dryer's air intake if the exhaust air is sufficiently dehumidified by the cooling effect of the evaporator, which causes water vapour to condense out of the exhaust air as it drops in temperature. Accordingly, the intake air of the dryer can be fresh outdoor air, recirculated return air, or a combination thereof. By placing the evaporator 36' on a down-turned duct run 410 through which exhaust air flows downward, the airflow through this evaporator-cooled duct 410 does not oppose the gravitational drainage of water condensate from the evaporator-cooled exhaust air. Instead, the downward direction of air flow through this evaporator-cooled duct 410 encourages evacuation of the condensate from the duct 410 through a drain 422 installed thereon near the bottom end thereof. So, the evaporator reclaims heat from the exhaust air of the dryer in order to pre-heat the fresh outdoor intake air being drawn in past the condenser, and also dehumidifies the exhaust air for to enable recirculation thereof back to the dryer.

Control dampers may be placed in the exhaust and intake ductwork to control the relative mixture of fresh outdoor air and recirculated return air. For example, a return air control damper 424 is installed in the return path of the exhaust ductwork that ties into the intake ductwork. The motorized damper may be connected to an automated controller that adjusts the damper position based at least partly on readings by a humidity sensor installed in the exhaust ductwork at a location downstream of the evaporator to detect the relative humidity of the evaporator-cooled exhaust air. One or more additional sensors may be employed in the intake ductwork, for example at a location upstream of the return air entry point to detect the relative humidity of the fresh outdoor air, and/or at a location downstream of the return air entry point to detect the relative humidity of collective intake air, which depending on the damper positions may be fresh outdoor air, recirculated return air, or a combination thereof.

A secondary air inlet 426 may open into the lateral intake duct 418 upstream of the condenser 16''' to enable intake of air from other cool air resources, whether as a supplement to or replacement for the fresh outdoor air. Accordingly, in addition to the return air control damper 424, other control dampers may include a primary outdoor intake damper 428 at the primary outdoor inlet 430 of the intake ductwork, a secondary source intake damper 432 at the secondary inlet 426, and a post-condenser damper 434 situated downstream of the condenser 16''' and upstream of the return air inlet of the intake ducting to control the relative mixture of evaporator-cooled return air versus condenser-preheated fresh air. Electronic controllers and sensors for automated control of motorized dampers based on detected air flow conditions are well known, and thus not described herein in further detail.

As shown in FIG. 8, the vapour and liquid conveyance lines 30', 34' may feature auxiliary branches 30f, 34f connected thereto with suitable valving to enable optional connection of one or more additional condenser circuits to feed one or more other heat-requiring applications, for example to add a supply water pre-heating circuit 302 like that of FIG. 7. While the example of FIG. 8 illustrates a clothes dryer implementation that employs an outdoor air intake, it will be appreciated that the use of the evaporator on the exhaust ductwork of a clothes dryer can be used to pre-heat intake air even in embodiments wherein outdoor air is not used, and where ambient indoor air is the only source of intake. Accordingly, recouped heat energy from the exhaust air can be employed to pre-heat intake air and increase the energy efficiency of a clothes dryer without having to necessary install an outdoor fresh air intake. Likewise, although placement of the evaporator at a down-flowing location on the exhaust ductwork has the aforementioned benefits regarding condensate drainage, alternate placement of the evaporator is still within the scope of the present invention, just as the condenser may be placed at locations other than that described, so long as it interacts with intake air being drawn into the air intake of the dryer, and provided that the condenser position is elevated relative to the evaporator in embodiments intended to benefit from passive circulation of the refrigerant. Since various modifications can be made in my invention as herein above described, and many apparently widely different embodiments of same made, it is intended that all matter contained in the accompanying specification shall be interpreted as illustrative only and not in a limiting sense.

The invention claimed is:

1. A passive heat recovery or defrosting apparatus comprising:
an evaporator;
a condenser;
fluid conveyance lines connected between the evaporator and the condenser to form a closed loop therewith, said fluid conveyance lines including a vapour conveyance line for travel of vapour from the evaporator to the condenser and a liquid conveyance line for travel of liquid from the condenser to the evaporator;
a working fluid contained within said closed loop;
wherein either the evaporator of the condenser comprises a first ring-shaped body for placement around or inline with a first pipe or duct in order to undergo heat exchange with a substance flowing through of said first pipe or duct, said first ring-shaped body having a first annular internal chamber into which the liquid conveyance opens near a bottom end of said chamber, and into which the vapour conveyance line opens at a more elevated location than said liquid conveyance line; and
said vapour and liquid conveyance lines are routed, or are routable, downwardly from said condenser to a point of lower elevation at a spaced distance from said condenser to place the evaporator at said lower elevation, whereby evaporated working fluid from the evaporator rises up into the condenser through the vapour conveyance line, then condenses back into a liquid state before gravitationally returning to the evaporator through the liquid conveyance line,
wherein said ring-shaped body comprises an inner wall that spans around a central longitudinal axis of the ring-shaped body at a distance spaced outwardly from said central longitudinal axis, and an outer wall that spans around said central longitudinal axis and around said inner wall at a greater distance from the central longitudinal axis than said inner wall, and the annular internal chamber is a hollow space delimited between said inner and outer walls.

2. The apparatus of claim 1 wherein the condenser comprises a multi-section condenser circuit having different condenser sections in respective heat exchange relationship with different heat-requiring applications.

3. The apparatus of claim 1 wherein the condenser comprises said first ring-shaped body for placement around or inline with said first pipe or duct.

4. The apparatus of claim 1 in combination with said first pipe or duct, wherein said first pipe or duct traverses through an exterior envelope of a building between an indoor space of the building and a surrounding outdoor environment, the condenser is installed on said first pipe or duct at or adjacent an exterior end thereof situated outside the building in the outdoor environment to defrost said exterior end of said first pipe or duct, and the evaporator is located within the indoor space of the building.

5. The apparatus of claim 1 wherein the condenser comprises said first ring-shaped body for placement around or inline with the first pipe or duct, and the evaporator comprises a second ring-shaped body with a second annular internal chamber, whereby the evaporator is arranged for placement around a second pipe or duct.

6. The apparatus of claim 5 in combination with a concentric vent assembly featuring an inner flue pipe disposed concentrically inside a larger outer intake pipe, wherein the second ring-shaped body of the evaporator is placed around the inner flue pipe and the first ring-shaped body of the condenser is placed around the larger outer intake pipe.

7. The apparatus of claim 1 in combination with an exhaust line of a heating appliance, wherein the evaporator comprises the first ring-shaped body and is placed around said exhaust line to collect heat therefrom.

8. The apparatus of claim 7 wherein said heating appliance is a clothes dryer, furnace, or hot water heater.

9. The apparatus of claim 1 in combination with a wastewater pipe, wherein the evaporator comprises the first ring-shaped body, which is placed around said wastewater pipe.

10. The apparatus of claim 9 wherein the condenser is installed in heat exchange relationship with a hot water heater supply line to preheat an incoming water supply for said hot water heater.

11. The apparatus of claim 10 wherein the condenser comprises a multi-section condenser circuit, of which one section is in heat exchange relation with the hot water heater supply line, while another section is installed in heat exchange relationship with an air intake of a heating appliance.

12. The apparatus of claim 1 in combination with a heating appliance having an air intake and an exhaust line, wherein the evaporator comprises the first ring-shaped body, which is placed around said exhaust line to collect heat therefrom, and the condenser is placed in heat exchange relationship with at least the air intake of said heating appliance.

13. The apparatus of claim 12 wherein said heating appliance is a clothes dryer or furnace.

14. The apparatus of claim 12 wherein the condenser is also placed in heat exchange relationship with a water supply line of a hot water heater in order to preheat incoming supply water for said hot water heater.

15. The apparatus of claim 14 wherein the condenser comprises a multi-section condenser circuit having different sections in respective heat exchange relationships with the air intake of the heating appliance and the water supply line of the hot water heater.

16. The apparatus of claim 3 wherein the first and second connections of the conveyance lines to the condenser are both located on an interior of said first ring-shaped body of the condenser and both open into the annular chamber through the inner wall of the first ring-shaped body of the condenser.

17. The apparatus of claim 3 further comprising an outer mounting unit closing concentrically around the first ring-shaped body of the condenser and having a lower end arranged to fit externally over an end of the first pipe or duct to support the ring-shaped condenser inline thereon.

18. The apparatus of claim 3 wherein the conveyance lines comprise pipes extending longitudinally off the condenser to hang therefrom in predetermined positions relative thereto.

19. The pipe defroster of claim 18 wherein the evaporator comprises an additional pipe coupled between said conveyance lines at lower ends thereof.

\* \* \* \* \*